(12) United States Patent
Inoue

(10) Patent No.: US 8,760,887 B2
(45) Date of Patent: Jun. 24, 2014

(54) POWER SUPPLY CIRCUIT

(75) Inventor: Masaaki Inoue, Osaka (JP)

(73) Assignee: Onkyo Corporation, Neyagawa-shi (JP)

( * ) Notice: Subject to any disclaimer, the term of this patent is extended or adjusted under 35 U.S.C. 154(b) by 215 days.

(21) Appl. No.: 13/366,477

(22) Filed: Feb. 6, 2012

(65) Prior Publication Data

US 2012/0267956 A1    Oct. 25, 2012

(30) Foreign Application Priority Data

Apr. 20, 2011  (JP) ................................. 2011-093583

(51) Int. Cl.
   *H02M 3/335*         (2006.01)

(52) U.S. Cl.
   USPC .................... 363/16; 363/21.09; 363/21.17

(58) Field of Classification Search
   USPC .......... 363/16, 18, 19, 20, 21.01, 21.4, 21.07, 363/21.08, 21.09, 21.1, 21.11, 21.12, 21.15, 363/21.16, 21.17, 21.18, 97; 323/267, 315
   See application file for complete search history.

(56) References Cited

U.S. PATENT DOCUMENTS

| | | | |
|---|---|---|---|
| 6,130,831 A | 10/2000 | Matsunaga | |
| 7,388,764 B2 * | 6/2008 | Huynh et al. | ............... 363/21.16 |
| 8,098,059 B2 | 1/2012 | Nakahashi et al. | |
| 2005/0225360 A1 | 10/2005 | Hachiya | |

FOREIGN PATENT DOCUMENTS

| | | |
|---|---|---|
| JP | 58-099267 A | 6/1983 |
| JP | 06-153494 | 5/1994 |
| JP | 08-033341 | 2/1996 |
| JP | 2000-134943 | 5/2000 |
| JP | 2001-037223 | 2/2001 |
| JP | 2007-037250 | 2/2007 |
| JP | 2009-016997 | 1/2009 |
| JP | 2009-194971 | 8/2009 |
| JP | 2009-303313 | 12/2009 |

OTHER PUBLICATIONS

European Search Report for corresponding European Application No. EP12 15 5559 dated Dec. 7, 2012.

* cited by examiner

*Primary Examiner* — Gary L Laxton
*Assistant Examiner* — Afework Demisse
(74) *Attorney, Agent, or Firm* — Renner, Otto, Boisselle & Sklar, LLP

(57) ABSTRACT

A current mirror circuit converts a positive-side supply voltage of a second power supply with respect to a reference potential into an electric current so as to supply the electric current to a current/voltage converting section. The current/voltage converting section converts the electric current from the current mirror circuit into a voltage with respect to the reference potential of a first power supply so as to supply the voltage to a feedback input terminal of a switching controller. Therefore, although the reference potential of the first power supply supplied to the switching controller is different from the reference potential of the second power supply, the electric current from the current mirror circuit is not influenced by the reference potential.

5 Claims, 2 Drawing Sheets

POWER SUPPLY CIRCUIT

BACKGROUND OF THE INVENTION

1. Field of the Invention

The present invention relates to a power supply circuit having a first power supply as a single power supply and a second power supply as a single power supply.

2. Description of the Related Art

Some audio devices have a circuit operated by a first power supply as a single power supply and a circuit operated by a second power supply as a single power supply whose voltage is different from that of the first power supply. The single power supply includes a positive-side supply voltage and a reference potential such as a ground potential. The second power supply includes the positive-side supply voltage that is generated by switching and operating the positive-side supply voltage of the first power supply by means of a switching element, and a reference potential that is generated by dividing the positive-side supply voltage of the first power supply. A switching controller and the switching element are operated by the positive-side supply voltage and the reference potential of the first power supply. On the other hand, the positive-side supply voltage of the second power supply with respect to the reference potential should be fed back to the switching controller so as to be maintained at a predetermined voltage (for example, 5 V). However, since the first power supply and the second power supply have the different reference potentials, the positive-side supply voltage of the second power supply cannot be directly fed back to the switching controller. In a conventional power supply circuit, the positive-side supply voltage of the second power supply is fed back to the switching controller by using a photocoupler. However, since the photocoupler is comparatively expensive, there is demanded a power supply circuit that feeds back the positive-side supply voltage of the second power supply to the switching controller without using the photocoupler.

JP 2009-16997, JP 2009-194971, and JP 2009-303313 describe power supply circuits having a feedback circuit, but do not describe a power supply circuit having a first power supply as a single power supply and a second power supply as a single power supply whose voltage is different from that of the first power supply, in which the positive-side supply voltage of the second power supply is fed back to the switching controller.

SUMMARY OF THE INVENTION

The present invention has been made to solve the above conventional problem, and an object thereof is to provide a power supply circuit that feeds back a positive-side supply voltage of a second power supply to a switching controller without using a photocoupler.

A power supply circuit haves a first power supply and a second power supply. The first power supply is a single power supply providing a positive-side supply voltage and a first reference potential. The second power supply is a single power supply providing a positive-side supply voltage and a second reference potential different from the first reference potential of the first power supply. The circuit comprises: a switching element; a switching controller operated by the positive-side supply voltage and the first reference potential of the first power supply, the switching controller controlling an ON/OFF state of the switching element according to a voltage input into a feedback input terminal; a switching transformer for generating a voltage in a secondary winding of the switching transformer according to the ON/OFF operation of the switching element connected to a primary winding of the switching transformer; a reference potential generating section for dividing the positive-side supply voltage of the first power supply so as to generate the second reference potential of the second power supply; a voltage generating section for generating the positive-side supply voltage of the second power supply upon receiving the voltage of the secondary winding of the switching transformer; a current mirror circuit for converting the positive-side supply voltage of the second power supply with respect to the first reference potential into an electric current so as to output the electric current; and a current/voltage converting section for converting the electric current from the current mirror circuit into a voltage with respect to the first reference potential of the first power supply so as to supply this voltage to the feedback input terminal of the switching controller.

A current mirror circuit converts the positive-side supply voltage of the second power supply with respect to a reference potential of the second power supply into an electric current so as to supply the electric current to a current/voltage converting section. The current/voltage converting section converts an electric current from the current mirror circuit into a voltage with respect to a reference potential of a first power supply so as to supply the voltage to a feedback input terminal of the switching controller. Therefore, although the reference potential of the first power supply to be supplied to the switching controller is different from the reference potential of the second power supply whose voltage should be stabilized, the electric current from the current mirror circuit is not influenced by the reference potential. For this reason, the positive-side supply voltage of the second power supply with respect to the reference potential of the second power supply can be fed back as the voltage with respect to the reference potential of the first power supply to the switching controller without using the photocoupler.

Preferably, the current mirror circuit includes a first transistor, a second transistor, and a first resistor, a control terminal of the first transistor is connected to a control terminal of the second transistor, a first terminal of the first transistor is connected to an output of the voltage generating section via the first resistor, a second terminal of the first transistor is connected to the current/voltage converting section, a first terminal of the second transistor is connected to the second reference potential of the second power supply, a second terminal of the second transistor is connected to the first reference potential of the first power supply.

When the same amount of electric current is caused to flow in a first transistor and a second transistor, a voltage between a first terminal and a control terminal of the first transistor becomes equal to a voltage between a first terminal and a control terminal of the second transistor. Since the control terminal of the first transistor and the control terminal of the second transistor are connected to each other, the first terminal of the first transistor and the first terminal of the second transistor have the same potential. Since the first terminal of the first transistor and the first terminal of the second transistor have the same potential, an electric current flowing in a first resistor corresponds to an electric current obtained by converting the positive-side supply voltage of the second power supply with respect to the reference potential. The electric current flowing in the first resistor is supplied from a second terminal of the first transistor to the current/voltage converting section.

Preferably, the voltage generating section includes a second resistor connected between the first reference potential of the first power supply and the second terminal of the first transistor, when a resistance of the first resistor is represented by R1, a resistance of the second resistor is represented by R2, and the positive-side supply voltage of the second power supply with respect to the first reference potential is represented by V2, a voltage V2·R2/R1 is supplied to the feedback input terminal of the switching controller, the switching controller controls the ON/OFF state of the switching element so that the voltage supplied to the feedback input terminal becomes a predetermined voltage.

The electric current flowing in the first resistor becomes V2/R1, and since this electric current is converted into a voltage by a resistor R2, a voltage V2·R2/R1 is supplied to the feedback input terminal of the switching controller. When the voltage V2·R2/R1 is higher than a predetermined voltage, the switching controller controls an ON/OFF state of a switching element so that the positive-side supply voltage of the second power supply is reduced. When the voltage V2·R2/R1 is lower than the predetermined voltage, the switching controller controls the ON/OFF state of the switching element so that the positive-side supply voltage of the second power supply is increased.

Preferably, the current mirror circuit further includes a constant voltage element between the first resistor and the first terminal of the first transistor.

In this case, fluctuation sensitivity of the positive-side supply voltage of the second power supply can be heightened.

DETAILED DESCRIPTION OF THE PREFERRED EMBODIMENTS

Figure 1:
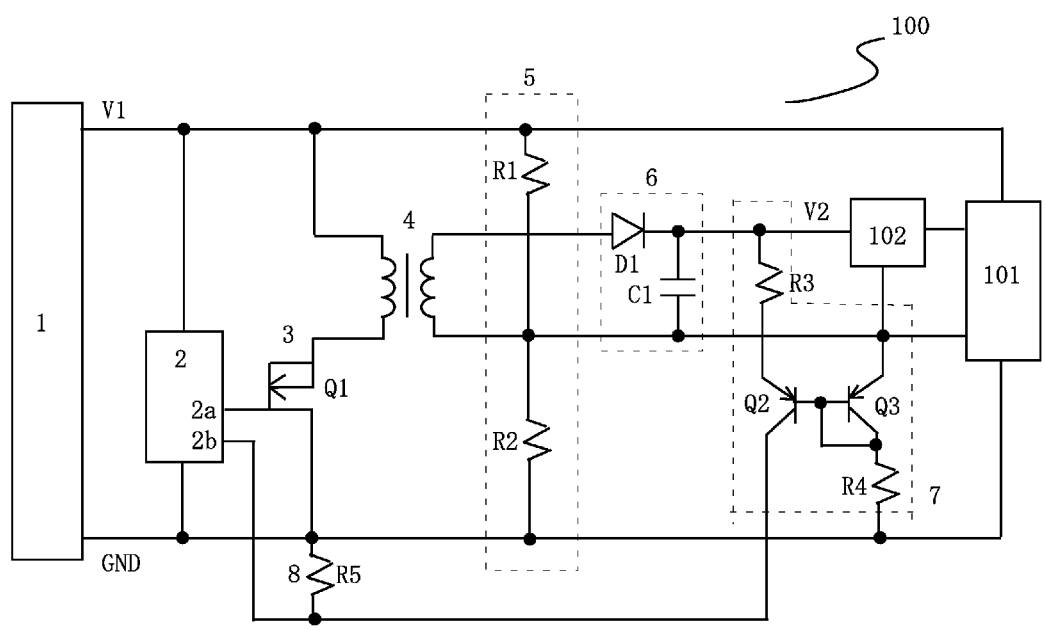
FIG. 1 is a circuit block diagram illustrating a power supply circuit according to a preferred embodiment of the present invention.

Preferred embodiments of the present invention will be specifically described below with reference to the drawings, but the present invention is not limited to the embodiments. FIG. 1 is a circuit block diagram illustrating a power supply circuit 100 according to the preferred embodiment of the present invention. The power supply circuit 100 generally has a first power supply 1, a switching controller 2, a switching element 3, a switching transformer 4, a reference potential generating section 5, a second power supply generating section 6, a current mirror circuit 7, and a current/voltage converting section 8.

The reference potential generating section 5 and the second power supply generating section 6 constitute a second power supply. The switching controller 2, the switching element 3, and the switching transformer 4 constitute a switching power supply. The current mirror circuit 7 and the current/voltage converting section 8 constitute a feedback circuit.

The first power supply 1 supplies a supply voltage to a first load (for example, an amplifying circuit) 101. The first power supply 1 is a single power supply, and includes a positive-side supply voltage V1 and a ground potential GND as a reference potential. The first power supply 1 employs a general AC adapter or the like, and converts an input AC supply voltage into a positive-side supply voltage V1 as a DC supply voltage and the ground potential GND, so as to output them to respective circuits at later stages.

The switching controller 2 is connected to a positive-side power supply line V1 of the first power supply 1 and the ground potential GND, and is operated by the first power supply. That is, a reference potential of the switching controller 2 is the ground potential GND of the first power supply 1. The switching controller 2 includes a control signal output terminal 2a and a feedback input terminal 2b. The switching controller 2 outputs a control signal from the control signal output terminal 2a to the switching element 3 according to a voltage to be input into the feedback input terminal 2b, and controls the ON/OFF state of the switching element 3.

The switching element 3 is controlled to be ON or OFF by the control signal from the switching controller 2. Although not particularly limited thereto, for example, an n-channel MOSFET Q1 may be employed as the switching element 3. A gate of the MOSFET Q1 is connected to the control signal output terminal 2a of the switching controller 2, its source is connected to the ground potential GND of the first power supply 1, and its drain is connected to one end of a primary-side winding of the switching transformer 4 (an end on a lower side of the drawing).

In the switching transformer 4, the other end of the primary-side winding (an end on an upper side of the drawing) is connected to the positive-side supply voltage line V1 of the first power supply 1, one end of a secondary winding (an end on the lower side of the drawing) is connected to a capacitor C1 of the second power supply generating section 6, and the other end of the secondary winding (an end on the upper side of the drawing) is connected to an anode of a diode D1 of the second power supply generating section 6. That is, one end of the secondary winding of the switching transformer 4 is connected to a reference potential line of the second power supply, and the other end of the secondary winding of the switching transformer 4 is connected to the positive-side supply voltage line of the second power supply.

When the control signal from the switching controller is at one level (for example, a high level), the switching element 3 is in an ON state, and the electric current flows through the positive-side supply voltage line V1 of the first power supply 1, the primary winding of the switching transformer 4, the switching element 3, and the ground potential GND of the first power supply 1. As a result, electric energy is accumulated in the primary winding of the switching transformer 4. On the other hand, when the control signal from the switching controller 2 is at the other level (for example, a low level), the switching element 3 is in an OFF state, and a positive-side supply voltage of a second power supply voltage is output from the secondary winding of the switching transformer 4 based on the electric energy accumulated in the primary winding of the switching transformer 4 when the switching element 3 is the ON state.

Therefore, when the switching controller 2 controls an ON/OFF period (duty ratio) of the switching element 3 according to the control signal, an amount of the voltage output from the secondary winding of the switching transformer 4 can be adjusted.

The reference potential generating section 5 is a circuit that divides the positive-side supply voltage V1 of the first power supply 1 so as to generate a reference potential of the second power supply. The reference potential generating section 5 includes, for example, resistors R1 and R2. One end of the resistor R1 is connected to the positive-side supply voltage line V1 of the first power supply 1, and the other end thereof is connected to one end of the resistor R2 and the reference potential line of the second power supply. The other end of the resistor R2 is connected to the ground potential line GND of the first power supply 1. Therefore, a reference potential of the second power supply is such that R2·V1/(R1+R2). In this formula, R1 represents a resistance of the resistor R1, R2 represents a resistance of the resistor R2. A relationship between the resistances of the resistors R1 and R2 can be suitably set according to a necessary reference potential, but the resistances may be set to the same values as one example.

The second power supply generating section 6 is a circuit for generating a positive-side supply voltage V2 of the second power supply. The second power supply generating section 6 includes the diode D1 and the capacitor C1. The anode of the diode D1 is connected to the other end of the secondary winding of the switching transformer 4, and its cathode is connected to one end of the capacitor C1. The other end of the capacitor C1 is connected to the reference potential line of the second power supply. The second power supply generating section 6 receives a voltage output from the secondary winding of the switching transformer 4 for a period that the switching element 3 is in the OFF state, so that the capacitor C1 is charged. A charging voltage of the capacitor C1 becomes the positive-side supply voltage V2 of the second power supply with respect to the reference potential.

The current mirror circuit 7 is a circuit for converting a voltage generated by the second power supply generating section 6 (namely, the positive-side supply voltage V2 of the second power supply with respect to the reference potential) into an electric current so as to feed back the electric current to the switching controller 2 (more specifically, the current/voltage converting section 8). That is, the current mirror circuit 7 notifies the switching controller 2 of the positive-side supply voltage V2 of the second power supply with respect to the reference potential so that the positive-side supply voltage V2 of the second power supply is maintained and is stabilized at a first predetermined voltage (for example, 5 V with respect to the reference potential).

The current mirror circuit 7 includes resistors R3 and R4, and transistors (not particularly limited, but for example, pnp-type bipolar transistors) Q2 and Q3. One end of the resistor R3 is connected to a positive-side power supply line V2 of the second power supply, and the other end is connected to an emitter (the first terminal) of the transistor Q2. A base (a control terminal) of the transistor Q2 is connected to a base of the transistor Q3, and its collector (a second terminal) is connected to the feedback input terminal 2b of the switching controller 2 and a resistor R5 of the current/voltage converting section 8. An emitter of the transistor Q3 is connected to the reference potential line of the second power supply, and its collector is connected to the ground potential line GND of the first power supply 1 via the resistor R4. Further, a base and the collector of the transistor Q3 are connected.

In the current mirror circuit 7, the bases of the transistors Q2 and Q3 are connected to each other, and a collector voltage (a voltage of the resistor R4) of the transistor Q3 is supplied to the bases of the transistors Q2 and Q3. The electric currents flowing in the transistors Q2 and Q3 are set to an equal value, so that a voltage between the base and the emitter of the transistor Q2 is equal to a voltage between the base and the emitter of the transistor Q3. Therefore, since the bases of the transistors Q2 and Q3 are connected, an emitter potential of the transistor Q2 is equal to an emitter potential of the transistor Q3. Therefore, a collector current of the transistor Q2 that is an electric current flowing in the resistor R3 corresponds to an electric current flowing from the positive-side power supply line V2 of the second power supply to the reference potential line of the second power supply, and is expressed by V2/R3. In this formula, R3 represents a resistance of the resistor R3, and V2 represents a value of the positive-side supply voltage of the second power supply with respect to the reference potential. That is, the collector current of the transistor Q2 corresponds to an electric current obtained by converting the positive-side supply voltage of the second power supply with respect to the reference potential.

The current/voltage converting section 8 converts the electric current supplied from the current mirror circuit 7 into a voltage with respect to the ground potential GND of the first power supply 1, and supplies the voltage to the feedback input terminal 2b of the switching controller 2. That is, the current/voltage converting section 8 converts the positive-side supply voltage with respect to the reference potential of the second power supply into a voltage with respect to the reference potential of the first power supply (the reference potential is converted). The current/voltage converting section 8 includes the resistor R5. One end of the resistor R5 is connected to the ground potential line GND of the first power supply 1, and the other end thereof is connected to the collector of the transistor Q2 and the feedback input terminal 2b of the switching controller 2. Therefore, the current/voltage converting section 8 generates a voltage V2·R5/R3, and supplies the voltage to the feedback input terminal 2b of the switching controller 2. In this formula, R5 represents a resistance of the resistor R5.

The switching controller 2 controls an ON period (namely, duty ratio) of the switching element 3 according to the voltage supplied to the feedback input terminal 2b. The switching controller 2 adjusts a control signal output to the switching element 3 so that the voltage input into the feedback input terminal 2b becomes a second predetermined voltage (for example, 1.2 V) with respect to the ground potential GND of the first power supply 1. That is, when the voltage input into the feedback input terminal 2b is lower than the second predetermined voltage, the switching controller 2 determines that the positive-side supply voltage of the second power supply is lower than the first predetermined voltage, and adjusts the control signal so that the ON period of the switching element 3 becomes long in order to increase the positive-side supply voltage of the second power supply. On the other hand, when the voltage input into the feedback input terminal 2b is higher than the second predetermined voltage, the switching controller 2 determines that the positive-side supply voltage of the second power supply is higher than the first predetermined voltage, and adjusts the control signal so that the ON period of the switching element 3 becomes short in order to decrease the positive-side supply voltage of the second power supply.

Hereinafter, description will be made using actual numerical values. The resistance of the resistor R3 is set to 5 kΩ, the resistance of the resistor R5 is set to 1.2 kΩ, and the first predetermined voltage of the positive-side supply voltage V2 of the second power supply with respect to the reference potential is set to 5 V. When the first predetermined voltage is 5 V that is a normal voltage, the electric current output from the current mirror circuit 7 has a value such that 5 V/5 kΩ=1 mA, and the voltage supplied to the feedback input terminal 2b of the switching controller 2 is obtained by 1 mA×1.2 kΩ=1.2 V, namely, the second predetermined voltage.

When the positive-side supply voltage of the second power supply is raised to 6 V, the electric current output from the current mirror circuit 7 has a value such that 6 V/5 kΩ=1.2 mA, and the voltage supplied to the feedback input terminal 2b of the switching controller 2 is such that 1.2 mA×1.2 kΩ=1.44 V that is higher than the second predetermined voltage of 1.2 V. Therefore, the switching controller 2 shortens the ON period of the switching element 3 so as to make the positive-side supply voltage of the second power supply approximate 5 V as the first predetermined voltage.

On the other hand, when the positive-side supply voltage of the second power supply is reduced to 4 V, the electric current output from the current mirror circuit 7 has a value such that 4 V/5 kΩ=0.8 mA, and the voltage supplied to the feedback input terminal 2b of the switching controller 2 is such that 0.8 mA×1.2 kΩ=0.96 V, that is lower than 1.2 V as the second predetermined voltage. Therefore, the switching controller 2 lengthens the ON period of the switching element 3 so as to make the positive-side supply voltage of the second power supply approximate 5 V as the first predetermined voltage.

As described above, according to this embodiment, although the reference potential of the second power supply is different from the reference potential of the first power supply supplied to the switching controller 2, the positive-side supply voltage of the second power supply can be fed back to the feedback input terminal 2b of the switching controller 2 without using a photocoupler, and the positive-side supply voltage of the second power supply can be maintained and stabilized at the first predetermined voltage. This is because the current mirror circuit 7 once converts the positive-side supply voltage of the second power supply into an electric current so as to eliminate an influence of the reference potential, and the current/voltage converting section 8 again converts the electric current into a voltage with respect to the reference potential of the first power supply voltage so as to supply the converted voltage to the switching controller 2.

Figure 2:
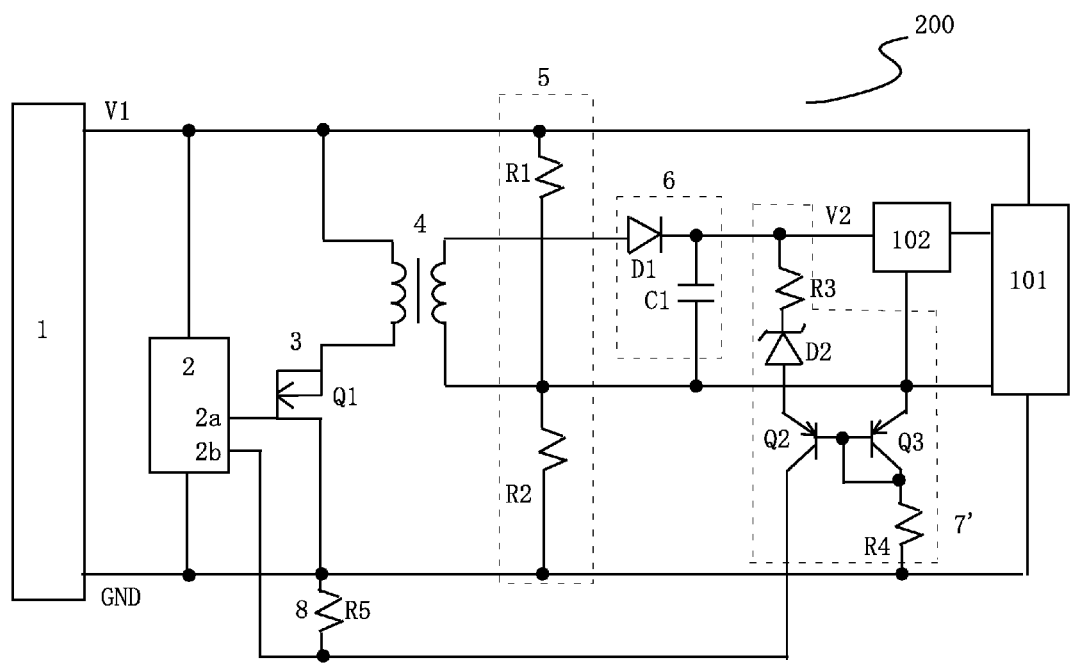
FIG. 2 is a circuit block diagram illustrating a power supply circuit according to another preferred embodiment of the present invention.

FIG. 2 is a circuit block diagram illustrating the power supply circuit 200 according to another preferred embodiment of the present invention. In the power supply circuit 200, a current mirror circuit 7' further includes a zener diode D2 as a constant voltage element between the resistor R3 and the emitter of the transistor Q2. The provision of the zener diode D2 can heighten sensitivity at the time when the positive-side supply voltage of the second power supply is fed back to the switching controller 2.

For example, a zener voltage of the zener diode D2 is determined as 4.9 V, and the resistance of the resistor R3 is determined as 100Ω. When the positive-side supply voltage of the second power supply is increased from 5 V to 5.1 V, since the electric current from the current mirror circuit 7' has a value such that (5.1 V−4.9 V)/100 Ω=2 mA, the voltage supplied to the feedback input terminal 2b of the switching controller 2 is such that 2 mA×1.2 kΩ=2.4 V. In this manner, according to a slight fluctuation in the positive-side supply voltage of the second power supply, the voltage to the feedback input terminal 2b of the switching controller 2 can be greatly changed. On the other hand, in the power supply circuit of FIG. 1, when the positive-side supply voltage of the second power supply is increased from 5 V to 5.1 V, the electric current from the current mirror circuit 7 has a value such that 5.1 V/5 kΩ=1.02 mA. For this reason, the voltage supplied to the feedback input terminal 2b of the switching controller 2 is such that 1.02 mA×1.2 kΩ=2.04 V. In the power supply circuit 200 in FIG. 2, the switching controller 2 can immediately control the ON period of the switching element according to the slight fluctuation in the positive-side supply voltage of the second power supply.

The preferred embodiments of the present invention are described above, but the present invention is not limited to the embodiments.

What is claimed is:

1. A power supply circuit having a first power supply and a second power supply, the first power supply being a single power supply providing a first positive-side supply voltage and a first reference potential, the second power supply being a single power supply providing a second positive-side supply voltage and a second reference potential different from the first reference potential of the first power supply, the circuit comprising:
   a switching element;
   a switching transformer for generating a voltage in a secondary winding of the switching transformer according to an ON/OFF operation of the switching element connected to a primary winding of the switching transformer;
   a switching controller operated by the first positive-side supply voltage and the first reference potential, the switching controller controlling an ON/OFF state of the switching element according to a voltage input into a feedback input terminal, said first positive supply voltage being supplied to the switching controller from a primary side of the switching transformer;
   a reference potential generating section for dividing the first positive-side supply voltage so as to generate the second reference potential;
   a voltage generating section for generating the second positive-side supply voltage upon receiving the voltage of the secondary winding of the switching transformer;
   a current mirror circuit for converting the second positive-side supply voltage with respect to the second reference potential into an electric current so as to output the electric current; and
   a current/voltage converting section for converting the electric current from the current mirror circuit into a voltage with respect to the first reference potential so as to supply this voltage to the feedback input terminal of the switching controller.

2. The power supply circuit according to claim 1, wherein the current mirror circuit includes a first transistor, a second transistor, and a first resistor,
   a control terminal of the first transistor is connected to a control terminal of the second transistor,
   a first terminal of the first transistor is connected to an output of the voltage generating section via the first resistor,
   a second terminal of the first transistor is connected to the current/voltage converting section,
   a first terminal of the second transistor is connected to the second reference potential,
   a second terminal of the second transistor is connected to the first reference potential.

3. The power supply circuit according to claim 2, wherein the voltage generating section includes a second resistor connected between the first reference potential and the second terminal of the first transistor,
   when a resistance of the first resistor is represented by R1, a resistance of the second resistor is represented by R2, and the second positive-side supply voltage with respect to the first reference potential is represented by V2, a voltage V2·R2/R1 is supplied to the feedback input terminal of the switching controller,
   the switching controller controls the ON/OFF state of the switching element so that the voltage supplied to the feedback input terminal becomes a predetermined voltage.

4. The power supply circuit according to claim 2, wherein the current mirror circuit further includes a constant voltage element between the first resistor and the first terminal of the first transistor.

5. The power supply circuit according to claim 1, wherein the reference potential generating section comprises a voltage dividing element having a first terminal and a second terminal, the first terminal electrically connected to a primary winding of the switching transformer and the second terminal electrically connected to a secondary winding of the switching transformer.

* * * * *